July 1, 1941.    G. B. LINDERMAN, JR    2,247,391
ABRADING APPARATUS
Filed Dec. 22, 1937    7 Sheets-Sheet 2
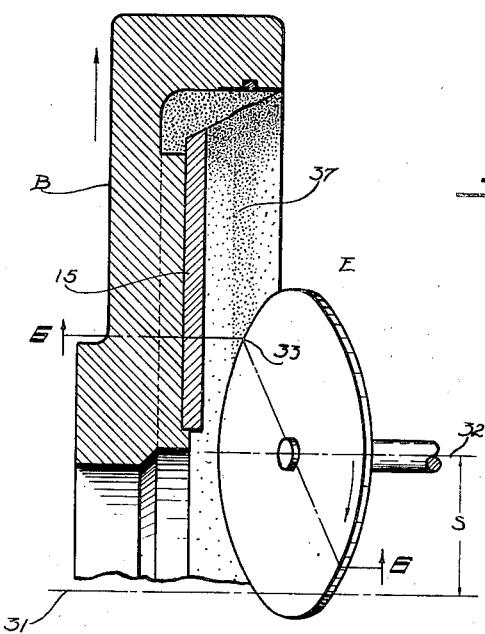
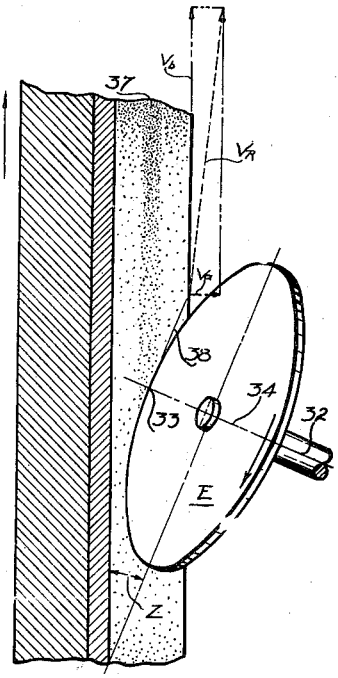
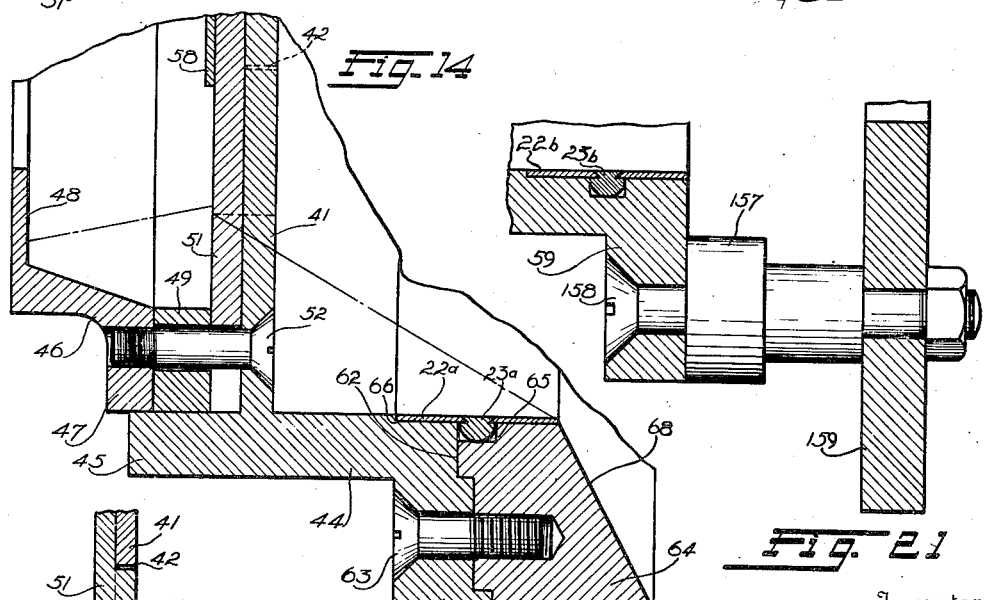
Inventor
Garrett B. Linderman, Jr.
By Strauch & Hoffman
Attorneys July 1, 1941.    G. B. LINDERMAN, JR    2,247,391
ABRADING APPARATUS
Filed Dec. 22, 1937    7 Sheets-Sheet 3
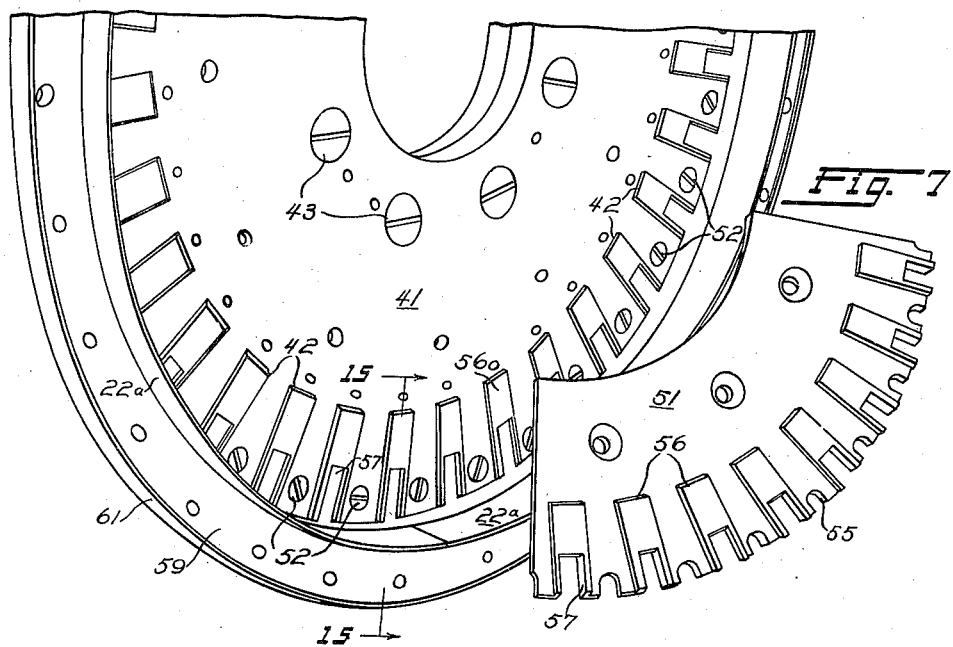
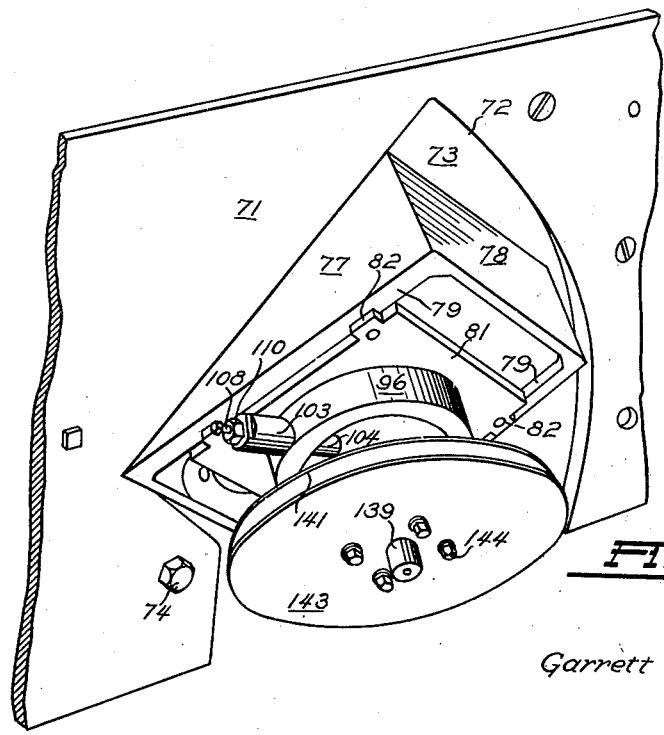
Inventor
Garrett B. Linderman Jr.
By Strauch & Hoffman
Attorneys

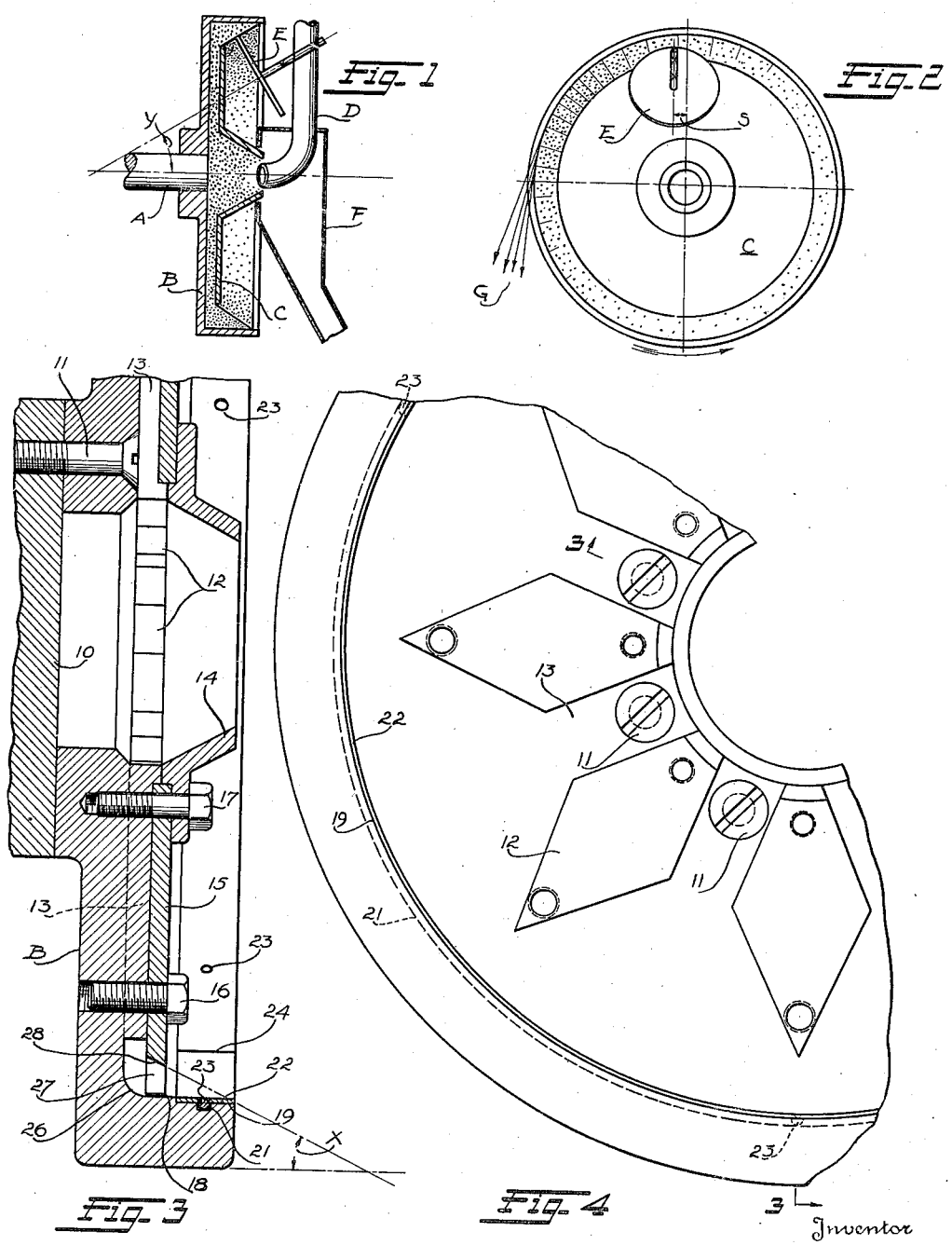

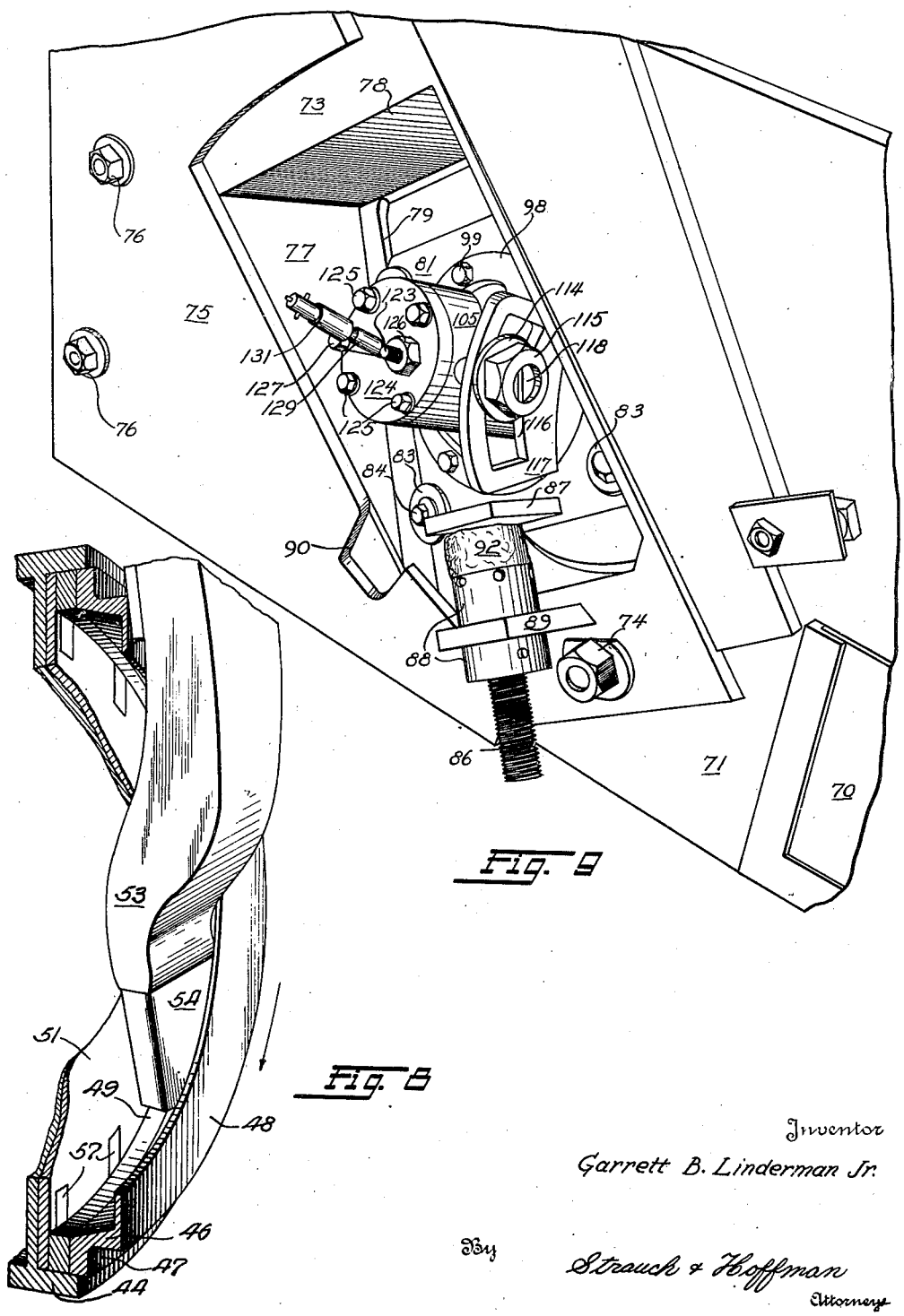

July 1, 1941.  G. B. LINDERMAN, JR  2,247,391
ABRADING APPARATUS
Filed Dec. 22, 1937  7 Sheets-Sheet 5

Inventor
Garrett B. Linderman Jr.

By Strauch & Hoffman
Attorneys

July 1, 1941.  G. B. LINDERMAN, JR  2,247,391
ABRADING APPARATUS
Filed Dec. 22, 1937  7 Sheets-Sheet 6

Inventor
Garrett B. Linderman Jr.

By  Strauch & Hoffman
Attorneys

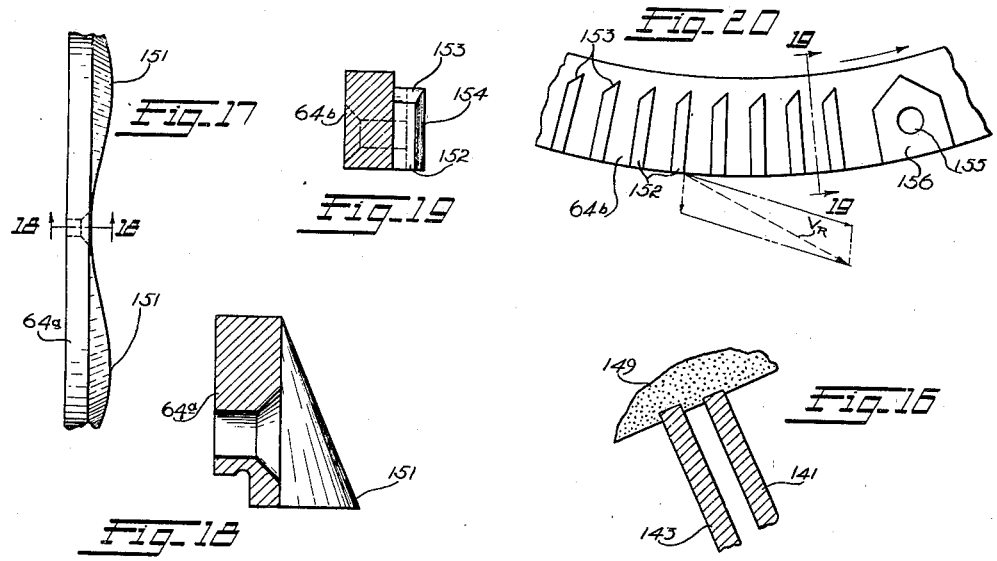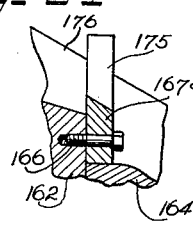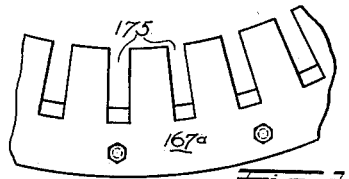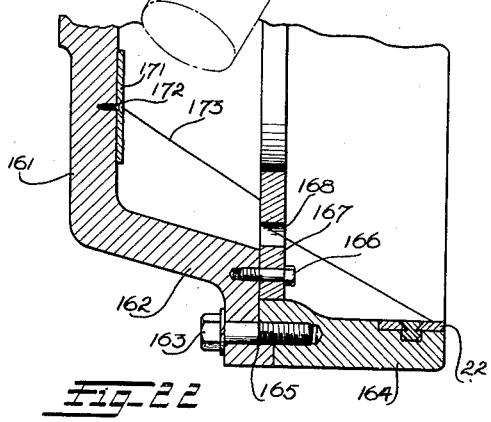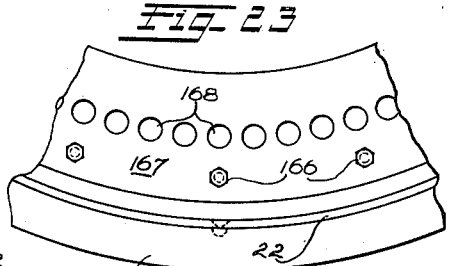

Patented July 1, 1941

2,247,391

UNITED STATES PATENT OFFICE 2,247,391

ABRADING APPARATUS

Garrett B. Linderman, Jr., Hagerstown, Md., assignor to Pangborn Corporation, Hagerstown, Md., a corporation of Maryland Application December 22, 1937, Serial No. 181,241

32 Claims. (Cl. 51—9)

The present invention relates to abrading apparatus, and more particularly to apparatus known in the trade as blast-cleaning machines embodying means for projecting a stream of abrasive in the form of sand or steel abrasive against castings or other articles of work to be cleaned of surface accumulations.

Although centrifugal abrading machines have been known for years in the abrading art, both with directional control and without directional control, the problem of wear of the blades and other parts has been a serious consideration, regardless of whether they are of the "slider" type, wherein the abrasive is admitted at low velocity over the inner ends of the blades and is continuously accelerated to the blade tips or whether they are wheels embodying batter blades where the entire abrading velocity is imparted to the abrasive by a single instantaneous impact therewith.

Although the slider type machines in commercial use today represent a great advance in the art over the machines heretofore in use they do not possess all of the operating characteristics desired and fall considerably short of the "ideal" machine which would pick the abrasive up without shock and gradually move it out to the periphery of the rotor without sliding it and then discharge it without wearing influence upon any part of the machine.

In the co-pending application of Walter L. Keefer, Serial No. 162,214, filed September 2, 1937, now Patent No. 2,116,153, dated May 3, 1938, there is disclosed an abrading machine which is quite a departure from the machines heretofore proposed and it also differs from the slider type commercial machines now in use as it does not pick-up the abrasive with abrasive propelling blades but employs a deflector for dislodging abrasive from the rim of a rotor operating at high speed.

The present invention relates to abrading machines embodying certain basic principles of those disclosed in the aforementioned Keefer patent and the major object thereof is to generally improve and refine the construction and operation of those machines and to provide machines possessing further highly desirable characteristics and advantages over the machines heretofore proposed.

It is another object to so relate the abrasive dislodging disc of an abrasive propelling rotor that the most efficient results are secured.

A further object of the invention is to provide an abrading machine having a rotor adapted to centrifugally retain abrasive on an inwardly facing surface with a rotatable disc for dislodging abrasive from the rim, the axis of the disc being so inclined and offset with respect to the axis of the rotor as to efficiently discharge the abrasive and produce minimum abrasion of the disc.

The invention also aims to provide an abrading machine having an inwardly facing abrasive retaining surface rotatable at high speed and a rotatable disc for dislodging the abrasive from the rim and discharging it therefrom at an abrading velocity, the axis of rotation of the disc being inclined to the axis of rotation of the rim and also offset forwardly with respect to the direction of rotation of the rim, to effect an efficient discharge of abrasive from the rim.

It is a further object to devise an abrasive propelling rotor of hollow construction and having an abrasive retaining surface from which it is adapted to be dislodged by a disc or the like, the parts being so designed as to maintain the rotor full of abrasive so as to insure static and dynamic balance of the machine during operation.

A further object is to provide an abrasive propelling rotor with a peripherally located abrasive-acceleration groove, and to provide stationarily supported means for depositing abrasive directly in the groove while the rotor is in operation, thereby allowing the abrasive to be directly picked up by the body of abrasive in the groove, without contacting machine parts.

Another object is to provide a rotatable disc assembly for dislodging the abrasive from the rim of an abrasive throwing rotor which is adjustably supported so that the inclination and also the degree of offset of the axis of the disc, with respect to the axis of the rotor, may be varied at will so as to vary the operating characteristics of the machine as may be desired.

Another object is to provide an abrasive dislodging disc having further important adjusting features for varying at will the location of the disc with respect to the rotor.

A further object is to provide a rotor having a web providing a flange structure defining an abrasive pick-up zone and an abrasive retaining zone from which the abrasive is adapted to be dislodged at a predetermined point in the rotation of the rotor, the two zones being disposed side-by-side and having means between them for controlling abrasive flow therebetween.

Still another object is to provide an abrading rotor having a rim from which the abrasive is dislodged by a disc or the like, with special forms of discharge edge constructions over which the abrasive is discharged and which are designed to impart various actions upon the abrasive, depending upon the discharge stream characteristics desired in the particular installation involved.

Another object is to provide a novel apparatus which makes use of a phenomenon discovered by me and which makes it possible to discharge the abrasive from the rim of the rotor with the expenditure of a minimum of energy.

My invention also aims to provide separate removable and replaceable wear elements to take the wear of the abrasive at critical points and to provide novel structures for protecting certain parts of the machine against abrasion.

Further objects of the invention will become apparent as the specification proceeds in connection with the annexed drawings, and from the appended claims. In the drawings:

Figure 1 is a longitudinal sectional view through one form of abrasive throwing wheel embodying the invention, and in order to simplify the disclosure certain parts are diagrammatically illustrated.

Figure 2 is an end elevation of the wheel shown in Figure 1 and illustrates the parts as they appear with the feed spout removed, and viewed from the right-hand side of Figure 1.

Figure 3 is a longitudinal section through the rotor shown in Figure 1 taken along line 3—3 of Figure 4 and illustrates details of the construction not shown in that figure.

Figure 4 is a fragmental face view of the rotor shown in Figure 3 and illustrates the parts as they appear when the feed cone and face plate have been removed from the rotor.

Figure 5 is a longitudinal sectional view through the machine illustrated in Figures 1 to 4, inclusive, and it has been taken through the rotor looking vertically upwardly along a vertical plane containing the axis of the rotor so as to illustrate the manner in which the take-off disc cooperates with the abrasive.

Figure 6 is a view somewhat similar to Figure 5, but it has been taken at an angle to the vertical so as to view the parts along a plane containing the axis of the take-off disc and the point of contact of the disc with the abrasive.

Figure 7 is a perspective view illustrating the front of a rotor of modified construction also embodying the invention, and this view also illustrates one of the wear plates used in the rotor as it appears when removed from the machine.

Figure 8 is a rear perspective view of the rotor of Figure 7 showing the manner in which the feed spout cooperates with the abrasive acceleration groove of the rotor.

Figure 9 is a perspective view of the bearing assembly for the disc and shows the manner in which it is supported on the housing.

Figure 10 is a perspective view of the take-off disc assembly and related parts employed in the form of invention illustrated in Figures 7, 8 and 9.

Figure 14 is an enlarged fragmental sectional view illustrating the periphery of the rotor web and flange structure of the rotor shown in Figure 7.

Figure 15 is a view somewhat similar to Figure 14, but the section is taken substantially along line 15—15 of Figure 7, so as to illustrate one of the openings in the wear plate.

Figure 16 is a fragmental sectional view taken transversely through the take-off discs and illustrates the manner in which they cooperate with the abrasive on the rim of the rotor.

Figure 17 is a fragmental side elevational view of a modified form of ring constituting a discharge edge over which the abrasive passes after it leaves the rim of the wheel.

Figure 18 is an enlarged sectional view taken along the line 18—18 of Figure 17.

Figure 19 is a fragmental transverse sectional view through a modified form of ring embodying blades, and is adapted to be used with the machine shown in Figure 14.

Figure 20 is an end elevational view of the structure shown in Figure 19.

Figure 21 is a fragmental sectional view on an enlarged scale of the rotor of Figure 14 as it appears when equipped with a deflector ring assembly, also forming part of the invention.

Figure 22 is a fragmental longitudinal sectional view of a further modified form of wheel forming part of the invention.

Figure 23 is a fragmental end elevational view of the structure shown in Figure 22 as it appears when viewed from the right-hand side of that figure.

Figure 24 is a fragmental sectional view showing a modified form of abrasive flow control ring for use in the apparatus shown in Figure 22; and Figure 25 is a fragmental end elevational view of the structure shown in Figure 24 as it appears when viewed from the right-hand side of that figure.

Figure 11:
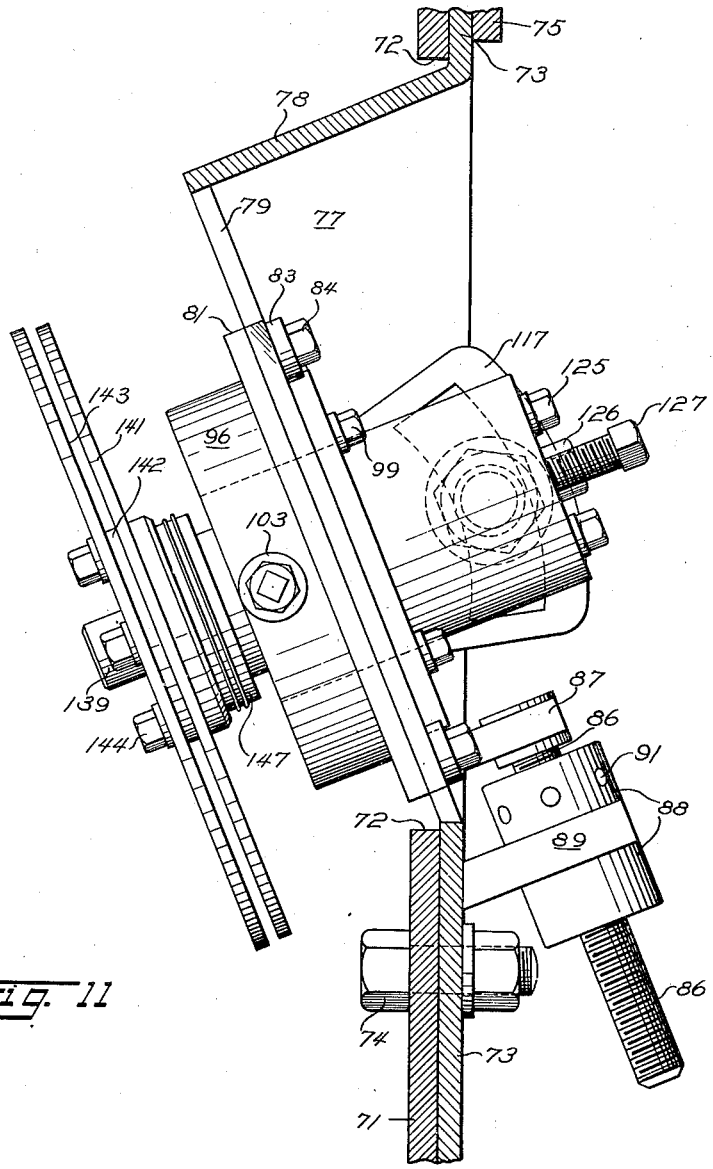
Figure 11 is a vertical sectional view through the housing and bed plates for supporting the take-off disc and shows the bearing assembly in elevation.

With continued reference to the drawings, wherein like reference characters have been employed to designate like parts throughout the several views thereof, and with particular reference to Figures 1 and 2, in which the apparatus is somewhat diagrammatically illustrated, a rotatable shaft A carries a rotor B having a web portion and a flange, and a plate C cooperates with the rotor to provide a central abrasive inlet and a plurality of passages for feeding the abrasive outwardly to the flange. A feed spout D is employed to feed abrasive into the wheel by gravity and a circular disc E, which will be hereinafter referred to as a "take-off" disc, is mounted for rotation on a shaft independently of rotor B and is operable to dislodge the abrasive from the rotor rim at a predetermined point in the rotation of the rotor. A hopper or chute structure F encloses the lower end of the feed spout and the feed cone of the rotor for carrying back into the abrasive reclamation system any abrasive which fails to properly enter the center of the wheel.

As seen in Figure 2, the axis of disc E is displaced forwardly with respect to the direction of rotation of the rotor a distance S. It is also observed in Figure 1 that the plane of disc E appears to be substantially normal to the surface of the abrasive lying on the rotor flange. The relationship of the axis of the disc E with respect to the rotor will be taken up in detail hereinafter.

By properly positioning the angular point of contact of disc E with the abrasive lying on the flange of the rotor the apparatus may be made to discharge in any desired direction. With the discharge disc located as shown in Figure 2, the discharge of abrasive from the wheel is found to take place as indicated at G at between the nine and ten o'clock position, and it occurs substantially tangentially as shown.

One detailed form which the rotor construction may assume is shown in Figures 3 and 4, and with continued reference to these figures, rotor B is secured to the enlarged end 10 of a shaft by means of a plurality of cap screws 11. The front face of the rotor is provided with a plurality of preferably diamond-shaped bosses 12 so as to define a plurality of outwardly flaring "lands" or grooves 13 on the face of the rotor. A cone-shaped feeding member 14 and a circular plate 15 are secured to the rotor by means of a plurality of cap screws 16 and 17, which hold plate 15 in clamping engagement with the tops of bosses 12. Member 14 cooperates with feed spout D as shown in Figure 1 and is operative to feed the abrasive into the passages defined by grooves 13 and plate 15.

The rim of the rotor is provided with a cylindrical surface 18 and a recessed cylindrical surface 19 having a peripheral groove 21 formed therein. A resilient ring 22, which assumes the form of a split metal band, is provided with a plurality of rivets or like projections 23, and it is sprung into place in the rotor against surface 19 with rivets 23 seating in groove 21. When the parts are in assembled position, the ends of the ring 22 are disposed in closely abutting relation as indicated at 24 and projections 23 prevent the ring 22 from being axially displaced with respect to the rotor. A curved surface 26 is provided where surface 18 merges into the web of the rotor and the outer edge of plate 15 is disposed closely adjacent surface 18 and is provided with a plurality of slots 27 having beveled inner ends 28.

Accordingly, with the rotor rotating at normal operating speed, preferably in the neighborhood of 2400 to 2500 R. P. M., when abrasive issues from spout D into member 14, it slides centrifugally over the inclined surface of the latter and finds its way into the outwardly extending passages. The abrasive then contacts curved surface 26 and is directed laterally through slots 27 in plate 15 and on to surface 18 and the inner surface of ring 22.

It has been found that the abrasive builds up on the flange at a predetermined angle of repose and then no more abrasive will pass through openings 27 unless disc E is in operative position. This angle has been designated in Figure 3 as angle X. The angle of repose will vary, depending upon the speed of the wheel and the nature of the abrasive. It has been found that with a speed of 2450 R. P. M. the angle of repose is approximately 27° when number 40 steel grit is used. At higher speeds the abrasive flattens out and decreases the angle of repose, but for the present purposes, the angle of 27° may be taken as the proper angle under practical operating conditions.

Slots 27 are preferably so dimensioned that when the wheel is operating up to speed and no abrasive is being dislodged from the rim by disc E, the layer of abrasive, built up to its angle of repose, will act as a barrier against the passage of further abrasive, thereby maintaining the wheel full of abrasive and if spout D happens to be supplying the wheel with abrasive at this time, the excess abrasive will merely be by-passed through hopper F back into the abrasive system. Therefore, no discharge of abrasive from the wheel will occur unless disc E is actually in operative scraping position.

The cylindrical surface 18 and the inner surface of ring 22 constitute the abrasive rim, and as they support the abrasive, they will be referred to hereinafter as the "abrasive-supporting surface." The abrasive-supporting surface is preferably of sufficient width so that when the abrasive builds up thereon to its angle of repose no discharge of abrasive from the rim will be effective unless disc E is actually employed to dislodge the abrasive.

Therefore, with the wheel rotating and being supplied with abrasive, a minute pile of abrasive will lie on the abrasive-supporting surface opposite each slot 27 in plate 15 and they are sufficiently numerous so that the piles of abrasive are comparatively close together. As a matter of fact, if desired, plate 15 itself may terminate short of surface 18 so that the abrasive will lie in a continuous conical pile upon the flange if desired. The inner edge 28 of opening 27 is preferably so designed as to predetermine the height of the layer and thereby insure that when the abrasive has built-up to its angle of repose the right-hand end of the layer will terminate short of the discharge edge.

It is also apparent that with the wheel rotating at operative speed, with abrasive being supplied through spout D, it is picked up with practically no impact whatever because the incoming abrasive contacts other abrasive closely adjacent the axis of rotation, and as it slides outwardly in grooves 13 it is gradually accelerated and when it is discharged onto the abrasive-supporting surfaces 18 and 22 it is rotating exactly at the speed of the rotor. Also, as soon as any quantity of abrasive is removed from the abrasive-supporting surface by disc E, abrasive promptly flows through slots 27 and automatically replenishes the abrasive discharged.

In dislodging or deflecting the abrasive from the rim of the rotor I make use of a phenomenon which enables the disc to effect discharge of the abrasive with a minimum of wear and in describing this phenomenon it will be helpful to point out that with a particle on an inclined plane, if inclination is slightly less than the angle of repose, the particle will not slide down the slope. However, if the particle is projected along the face of the plane, parallel to the upper horizontal edge, it will slide down the slope as long as it has any horizontal velocity. The particle will come to rest after taking a course describing a generally curved trajectory, and if it is again given a horizontal velocity it will again slide down the plane and if this process is repeated enough times it will eventually slide off the plane. This shows that as long as horizontal velocity can be supplied the particle will continue to slide down the slope. The wheel of this invention utilizes this principle, but it involves a rotating cone rather than an inclined plane, and furthermore the horizontal velocity is initiated by the take-off disc, and having once been initiated is automatically and continuously supplied by the inherent characteristics of the cone formed by the abrasive surface until it leaves the wheel.

For instance, with reference to Figure 3, assuming that the particle in question is lying on the surface of the layer of abrasive, and the surface of the abrasive is disposed at an angle just equal to the angle of repose, only a small force need be supplied to the particle by the take-off disc in order to start it moving down the inclined plane defined by the upper surface of the pile of abrasive.

I have discovered that once the abrasive is contacted by the take-off disc the particles will roll down the cone and will actually gain in velocity until it leaves the cone, thereby differing basically from the previous illustration of an inclined plane. This is explained by the fact that the surface velocity of the cone increases as the particle moves outwardly thereover (because of the increasing radius) with the result that the relative velocity between the cone and the particle is still higher, thereby causing the particle to continue to move and accelerate, whereas in the simple inclined plane example previously described the particle would come to rest after having been displaced a predetermined distance.

From the foregoing it is apparent that in order to cause the abrasive to discharge from the rim of the wheel, it is only necessary to set up a difference of velocity between a particular particle of abrasive and the surface defined by the pile of abrasive on the rotor rim. This can be effected by mounting the disc E with its axis lying in the same plane as the axis of the rotor, and applying a slight braking force upon it, so that the pressure of the disc sliding on the abrasive causes some of the abrasive to be decelerated to some speed between its own speed and the full peripheral speed of the wheel. For instance, a relative speed of three feet per second has been found sufficient to cause the abrasive to slide down the slope of the cone and be discharged by the wheel. However, in order to do away with the necessity for a braking mechanism and resulting frictional losses, I preferably mount the disc with its axis inclined and offset with respect to the axis of the rotor so as to set up the required difference in velocity of the abrasive and the wheel by a scraping or dislodging action. In Figures 5 and 6 I have fully disclosed one of the positions the disc may assume to efficiently discharge the abrasive.

First, referring to Figures 1 and 2, it will be observed that disc E is so mounted as to dispose its plane substantially normal to the plane of the surface of the abrasive on the rim. In other words, its axis is disposed at an angle Y with respect to the axis of shaft A, and which has been shown as being equal to angle X, the angle of repose of the abrasive. I have found that angle Y for best results may be greater but should not be less than the angle of repose of the abrasive on the rim. Therefore, if the angle of repose X is equal to 27°, angle Y should preferably be 27° or greater in order to effect efficient discharge of the abrasive.

Referring to Figure 5, which is a view looking vertically upward along a plane containing the axis of rotation 31 of the rotor, disc E is observed to be inclined but its axis 32 is nevertheless contained in a vertical plane parallel to a vertical plane containing axis 31 and spaced therefrom by a distance S. I have also found it preferable that the axis 32 of disc E be displaced forwardly with respect to the direction of the rotation of the rim from a parallel plane containing the axis of the rotor in order to dislodge the abrasive from the rim. If the disc axis is displaced rearwardly, the disc will effect a difference in velocity but it will interfere with the proper discharge of the abrasive because it will tend to push the abrasive up the inclined conical layer rather than downwardly, as is effected by a disc whose axis is displaced forwardly. The magnitude of S determines the scraping action that will be exerted upon the abrasive and hence influences the capacity of the wheel, as will hereinafter appear.

Disc E, due to the fact that it is displaced a distance S from the rotor axis 31, does not contact the abrasive along a horizontal plane containing the axis but contacts it at the point indicated at 33, and a line 34 (Figure 6) has been shown as passing through the point of contact of the disc with the abrasive and the axis of the disc 32.

Figure 6 is similar to Figure 5 but has been taken so as to look upwardly along a vertical plane containing the axis 32 of disc E in order to show the angularity that exists between the disc E and the abrasive at the point of contact. As seen in Figure 6, the plane of the disc makes an angle Z with the abrasive at the point of contact, and therefore abrasive contacting disc E is given an axial motion and upon being started on its course continues to move at an accelerated speed down the abrasive incline until it is discharged from the rim of the wheel.

From the foregoing it is apparent that when the wheel is in operation disc E will undergo rotation in the direction indicated in Figures 5 and 6 through contact thereof with the abrasive, and the disc will dislodge a layer of abrasive from the body of abrasive lying in the rim of the wheel. In Figure 6 I have indicated by reference character 37 the groove formed in abrasive remaining on the rim by the action of the disc in removing a layer of abrasive therefrom. However, groove 37 does not exactly show actual conditions because as soon as the abrasive lying on the rim is diminished in quantity, it is replenished by further abrasive passing through slots 27 in plate 15, so that by the time the wheel makes a complete revolution the abrasive on the rim has again assumed substantially the form shown in Figure 1.

Although the disc E may cooperate with any desired portion of the abrasive lying on the rim it preferably is so related to the wheel as to dislodge the abrasive adjacent plate 15 rather than near the discharge edge. In Figures 5 and 6 I have shown the disc as cooperating with approximately the mid-portion of the abrasive lying on the supporting surface.

As seen in Figure 2, with the disc E disposed in an upward position, the abrasive discharges downwardly, although it may be caused to discharge in any desired direction by moving the axis of disc E in an arc about the rotor axis in the proper direction to effect the desired direction of discharge. In view of the fact that the abrasive lying upon the supporting surfaces is rotating at exactly the speed of the rotor, when the abrasive is discharged, it will take a path almost exactly tangential to the rim of the rotor, especially in view of the fact that none of the parts of the apparatus acts upon the abrasive so as to give the final velocity a radial component.

In view of the fact that the abrasive in being discharged from the apparatus slides down the inclined surface of the abrasive, a slight axial component of velocity is imparted thereto and the conditions which bring this about are illustrated diagrammatically in Figure 6. With reference to Figure 6, the abrasive as it is dislodged by disc E takes a course approximately in accordance with line 38 and at the point of leaving the rim, it possesses a small axial componential velocity indicated by the vector $V_a$, and it also possesses a tangential component of velocity indicated by the vector $V_b$, the latter being equal to the peripheral speed of the rotor at the point where the abrasive leaves it. The resultant of these two velocities is indicated by the vector $V_R$ in Figure 6.

Therefore, work to be cleaned of scale, molding sand or other surface accumulations may be rapidly cleaned by placing it in the path of discharge of the wheel. If desired, the work may be moved under the wheel either by a conveyor, a tumbling barrel or the like, and the wheel caused to discharge down upon it as indicated in Figure 2. If desired, however, the wheel may be placed to one side of the work and disc E so adjusted as to cause the wheel to discharge sideways. On the other hand, if the work is to be passed over the wheel, disc E may be adjusted so as to cause the wheel to effect the discharge of the abrasive upwardly.

In Figures 7 to 16, inclusive, I have illustrated a further form of machine also embodying the invention, and with particular reference to Figures 7 and 14, the rotor embodies a web 41 having a plurality of rectangular openings 42 provided therein. The rotor is secured to a shaft by means of a plurality of screws 43 in a manner similar to the rotor of Figure 3 and it terminates at its periphery in a front flange 44 and a rear flange 45. Telescoped within flange 45 is an acceleration groove-forming ring 46 having a base portion 47 and an abrasive retaining flange 48. Disposed between base 47 and web 41 is a ring-like spacer element 49 and a removable wear plate assembly 51.

The entire assembly just described is secured in place on the rotor by means of a plurality of screws which pass through openings in the wear plate and the spacer and are threaded into the base portion of ring 46. Ring 46 cooperates with spacer 49 and wear plate assembly 51 to provide an inwardly facing abrasive-accelerating groove, and abrasive is fed thereto by a spout (Figure 8) 53 to which abrasive is supplied by gravity at a preferably metered rate of flow.

The lower end of the spout is provided with an offset portion 54 which conforms generally to the shape of the wheel and terminates slightly inside flange 47. It is observed that the spout 53 is so inclined that abrasive dropping into the acceleration groove possesses an initial velocity and direction so as to reduce the shock or impact as the abrasive strikes the rotating mass of abrasive carried in the accelerating groove.

As seen in Figure 7 the abrasive wear plate assembly 51 is preferably made in four sections for ease of replacement, and each section is provided adjacent its periphery with a slot 55 through which screws 52 pass. Each plate 51 is also provided adjacent its periphery with a plurality of generally rectangular bosses 56, each of which is of a size slightly smaller than openings 42 in rotor web 41, so that when they are assembled in the wheel bosses 56 will fit into openings 42. At the lower end of each boss there is provided an abrasive slot 57 through which the abrasive passes to the front of the wheel. The inner ends of plates 51 are secured in place on the rotor by a pair of semicircular plates 58, which are secured thereto by a plurality of screws (not shown).

It is, accordingly, apparent that rotor web 41, and also flange 45, which are permanent parts of the machine are fully protected against the action of the abrasive. Bosses 56 fit into openings 42 and protect the walls thereof against wear, and spacer 49 and ring 46 protect the inner face of the flange against wear.

Referring now to the front flange shown in Figure 14, flange 44 is provided with an outwardly extending flange 59 which in turn is provided with an axially directed flange 61. Flange 59 is also provided with an annular recess 62. Secured to flange 59 by a plurality of machine screws 63, which pass through openings therein, is an abrasive discharge ring 64. If desired, however, screws 63 may pass through openings in ring 64 and be threaded into flange 59.

As seen in Figure 14, ring 64 is so shaped as to conform to the meeting faces of flange 59 except that it is provided with an additional annular recess 65. Recess 65 cooperates with the rotor to provide a groove for the reception of rivet 23a of a flexible snap ring 22a which seats in a recess 66 provided in flange 44 and covers the inner surface of ring 64. This ring functions in a manner exactly similar to the ring 22 of Figure 3 and, accordingly, will not be further described. Ring 64 is provided with a conical discharge face 68 for a purpose that will presently appear.

I have shown a modified form of disc assembly for dislodging the abrasive from the rim of this form of wheel and it is shown more particularly in Figures 10, 11, 12 and 13. Referring to Figures 10 and 11, the wheel is provided with a housing having a flat side plate 71 and it is provided with a large segment-shaped opening 72 through which the take-off disc assembly extends. The take-off disc assembly is carried by a plate 73 which is mounted on the outside of side plate 71 for rocking movement about the axis of the rotor on a bolt and nut assembly 74, which may be tightened to securely clamp the parts after they have been properly adjusted. As seen more particularly in Figure 9, the upper or marginal edge of plate 73 is releasably clamped between the outside of side walls 71 and a cover plate 75 which is secured to the side wall outwardly of the range of movement of plate 73 by means of bolt and nut assemblies 76.

Therefore, when base plate 73 has been moved into its proper adjusted position it may be securely clamped to plate 71 by tightening bolt and nut assemblies 76. Plate 71 is also provided with a slidable door 70 (Figure 9), which may be opened to afford inspection of the machine while in operation.

Figure 13:
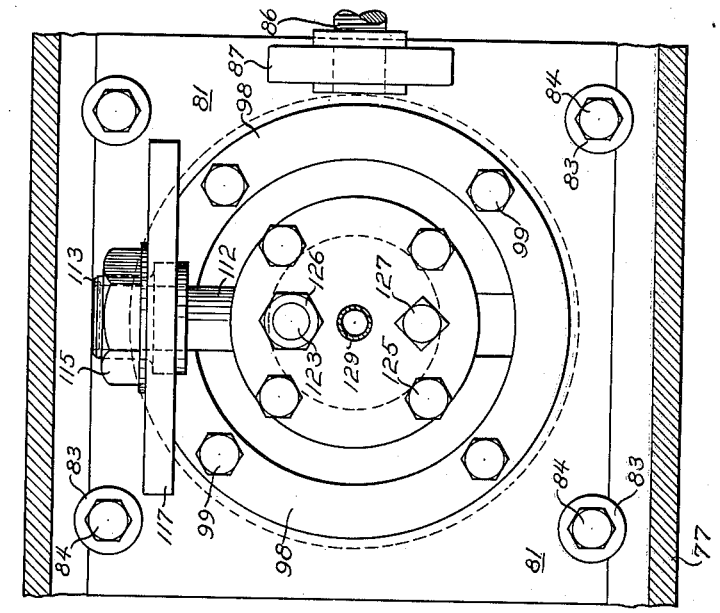
Figure 13 is a rear view of the bearing assembly and its mounting plate.

Referring to Figures 10 and 11, plate 73 is provided with a pair of triangular-shaped side walls 77 and an end wall 78. Walls 77 project into the housing and define a pair of guideways 79. All of the parts of the disc assembly are supported on a sliding carriage or plate 81, having four projecting ears 82 which cooperate with guideways 79. The opposite side of plate 81 as seen in Figure 13 is provided with four washer-like members 83 which are secured thereto by cap screws 84. Members 82 and 83 cooperate with opposite sides of guideways 79 and mount plate 81 for guided sliding movement in guideways 79.

Movement of carriage 81 is controlled by the mechanism shown in Figures 9 and 11, and it comprises a threaded member 86 which is non-rotatably secured in a lug 87 carried by plate 81, and a nut assembly designated generally at 88 which is threaded on member 86 and is provided with portions extending either side of a lug 89 secured to the face of base plate 73. The two parts of nut assembly 88 are rigidly secured together so as to lock plate 81 against movement in either direction, and it is, accordingly, seen that by inserting a tool in the openings 91 provided therein, it may be rotated to cause threaded member 86 to move up or down, thereby effecting a similar movement of carriage plate 81. In order to prevent abrasive from working into the threads of member 86, I preferably provide a sealing assembly 92 (Figure 9) between nut 88 and lug 87.

By rotating nut 88, the carriage plate may be moved up or down and as it moves substantially radially the disc assembly may, accordingly, be moved toward and away from the rim of the wheel. In order to prevent lug 87 from restricting the angular adjustment of plate 73, plate 75 is provided with a recess 90 for accommodating it.

Figure 12:
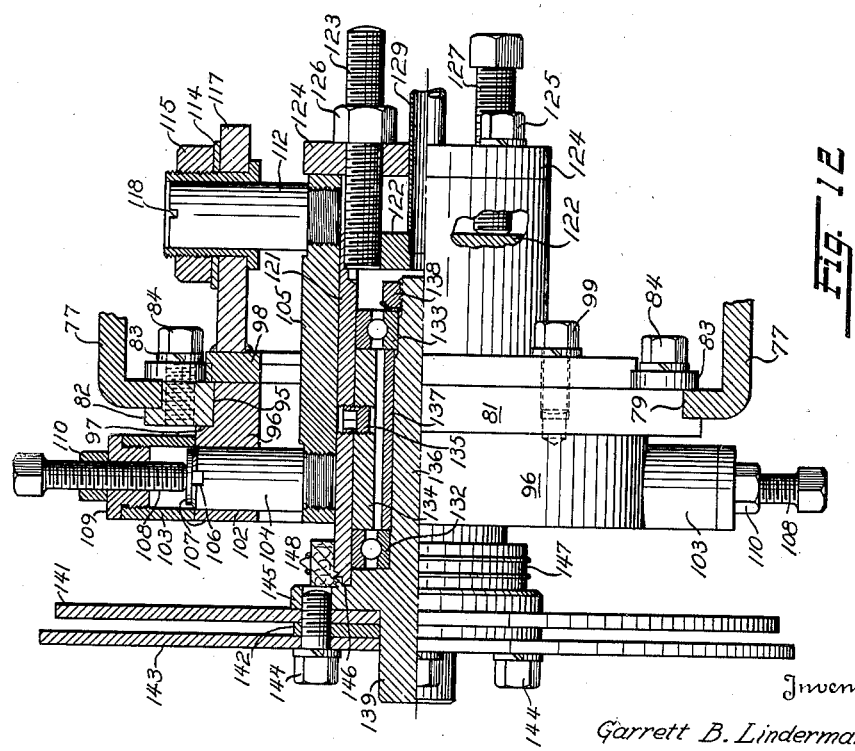
Figure 12 is a view looking down upon the take-off disc bearing assembly, and one-half of the structure is shown in section to more clearly illustrate the details thereof.

Referring now to Figures 12 and 13, plate 81 is provided with a cylindrical opening 95 and extending therethrough is a head 96. The head 96 is provided with a clamping shoulder or face 97 abutting cooperation with the front face of plate 81, and secured to the rear of head 96 by means of a plurality of cap screws 99 is a ring 98. The parts are preferably so dimensioned that when screws 99 are pulled up tight, ring 98 will pull shoulder 97 of head 96 into clamping engagement with the front of plate 81, thereby locking the parts in fixed angular position.

Sleeve 96 is provided with a pair of aligned openings 102 which register with a pair of hollow sleeves 103 secured to the outer face of member 96 by a welding operation or the like. Journaled in openings 102 are a pair of trunnion pins 104 which are threaded into a sleeve 105 which constitutes the support for the bearing assembly of the take-off disc shaft. Trunnion pins 104 are provided with screw driver slots 106 so that they may be firmly threaded home in the sleeve 105, and covering slots are a pair of discs 107. Bearing against disc 107, for preventing endwise movement of trunnion pins 104 in their bearings, are a pair of screws 108 which in turn are threaded into cap members 109 which are threaded into members 103. A lock nut 110 is employed to secure the parts after they have been properly adjusted.

From the foregoing it is apparent that sleeve 105 is journaled for rocking movement in member 96 and that if desired sleeve 105 may be moved transversely to its longitudinal axis by loosening locknuts 110 and rotating screws 108 in the proper direction to effect the desired displacement. Locknuts 110 may then be tightened to securely lock the parts in the desired adjusted positions. This adjustment of the device increases or decreases the degree of offset S, previously discussed.

I have provided means for adjustably locking sleeve 105 in any desired position about the axis of trunnion pins 104, and it is most clearly shown in Figures 12 and 13. A pin 112 is threaded into sleeve 105 and is disposed parallel to trunnion pins 104 and lies in the same plane thereof. Pin 112 extends freely through an externally threaded thimble 113, a lockwasher 114, and a nut 115. Thimble 113 extends through an arcuate, preferably graduated slot 116 formed in a bracket member 117 secured to ring 98. In view of the fact that ring 98 is connected to member 96 by way of cap screws 99 it is apparent that pin 112 will always assume a fixed position with respect to head 96 no matter what angular adjustment head 96 may assume with respect to plate 81.

Whenever it is desired to change the angle of inclination of the axis of the take-off disc with respect to the axis of the rotor, nut 115 is loosened and the parts rocked into the desired position about the axis of trunnion pins 104. When the desired adjustment has been obtained, nut 115 is tightened to securely lock the parts in place. In view of the fact that pin 112 is freely slidable in thimble 113, it is apparent that screws 108 may be adjusted to shift the axis of the disc transversely of its longitudinal axis without changing the angle of inclination thereof, as during this operation pin 112 merely slides within thimble 113, maintaining the angle of inclination constant.

Mounted for sliding longitudinal movement within sleeve 105 is a bearing sleeve 121 which is provided with an end cap 122 rigidly secured thereto. Rigidly anchored in cap 122 is a stud member 123 and it extends loosely through an end cap 124 secured to sleeve 105 by a plurality of cap screws 125. A nut 126 is threaded on stud 123 and by rotating it in the proper direction, sleeve 121 may be pulled to the right with respect to sleeve 105. In order to produce the opposite movement of sleeve 121, a bolt member 127 is threaded into cap 124 and bears against member 122 so that by rotating bolt 127 in the proper direction, sleeve 121 may be moved to the left with respect to sleeve 105. When the parts are in their desired adjusted position, screw 127 and nut 126 may be tightened so as to rigidly lock them in place. It is also apparent that by adjusting nut 126 and screw 127 the take-off disc assembly may be moved toward or away from the rotor without varying the angle of inclination and without disturbing any of the other adjustments.

A conduit 129 is rigidly secured in an opening in cap 122 and is freely slidably associated with an opening in cap 124. Conduit 129 terminates in a lubricant fitting 131 (Figure 9) for connection to a grease gun or the like for supplying lubricant to the interior of sleeve 121 for lubricating the bearings.

Mounted in sleeve 121 are a pair of anti-friction bearings 132 and 133 and they are held in place by means of a sleeve 134. Sleeve 134 is secured in position by means of a set screw 135 passing through an opening in sleeve 121 and threaded into sleeve 134. Mounted within bearings 132 and 133 is a shaft 136. Bearings 132 and 133 are spaced apart on shaft 136 by means of a spacing sleeve 137, and the entire assembly is secured in place thereon by means of a nut 138 threaded on a reduced end portion of the shaft.

It is to be understood that many of the features of the various forms of the invention are interchangeable, and the appended claims are intended to embrace them in their several contemplated combinations. For instance, the various forms of discharge rim constructions may be used with the rotor shown in Figures 1 to 6, inclusive, as well as with the rotor of Figure 14. Also, the double take-off disc assembly of Figures 11, 12 and 13 may be used with the rotor of Figures 1 to 6, inclusive, instead of the single disc.

Shaft 136 is provided at its outer end with a piloting surface 139, upon which are mounted an inner disc 141, a spacer plate 142, and an outer disc 143. These parts are held in place on shaft 139 by means of a plurality of cap screws 144, which are threaded into a flange 145 provided on shaft 136. In order to prevent abrasive from finding its way into the bearing assembly, shaft 136 is preferably provided with a labyrinth joint with sleeve 121, as indicated at 146, and also a rubber sealing member 147 is secured to a flange provided on shaft 136 by means of a wire 148 or the like.

The manner in which the take-off disc dislodges the abrasive from the rim of the wheel is substantially the same as that described in connection with Figures 5 and 6 of the drawings illustrating the first form of the invention. However, in view of the fact that two discs 141 and 143 are here employed, a greater volume of abrasive is dislodged at each revolution of the wheel and the angle of the discharge stream is greater than in the form of invention first described. Referring to Figure 16, I have somewhat diagrammatically illustrated the manner in which the discs cooperate with the body of abrasive. In this figure the body of abrasive is indicated by the reference character 149 and it will be observed that disc 141 dislodges a predetermined amount of abrasive or is embedded a predetermined distance in the body of abrasive, whereas disc 143, which slightly follows the scraping action of disc 141 (in point of rotation) is disposed to a greater depth in the body of abrasive and is hence of greater diameter. Although it is preferable to start with discs 141 and 143 of different diameters in order to provide vibrationless operation, they may, if desired, be of equal size as it has been found that they will wear to the proper relative diameters after they have been in service.

It is, accordingly, apparent that in this form of the invention, Figures 7 to 16, inclusive, the abrasive is fed to the pick-up groove at the rear of the wheel, and through contact with the body of the abrasive lying in the groove, acquires within several revolutions, the full wheel velocity. The abrasive then flows from the pick-up groove, through the openings 57 in wear plate 51 and onto the front rim where it builds up to its angle of repose. Discs 141 and 143 dislodge or scrape the abrasive from the rim, and as soon as it has been removed, it is immediately replaced by further abrasive flowing through openings 57. If desired, openings 57 may be extended inwardly to a further distance, so as to allow the abrasive to flow freely therethrough without contacting their inner edges, thereby making for a greater inherent abrasive handling capacity of the wheel.

The stream discharged from this wheel is slightly different from that of the wheel previously described because of the conical discharge face 69, which imparts an axial velocity to the abrasive and causes the stream to spread out or be diffused axially and cover a greater area of the work.

It is also apparent that through the adjustments provided for the disc, the disc assembly may be moved toward and away from the rotor web without changing the angle of inclination thereof; the axis of the disc may be shifted transversely to increase or decrease the displacement S; the angle of inclination may be varied without changing any of the other adjustments, and also, by rotating nut member 86, the disc assembly may be moved bodily toward and away from the rim of the rotor so as to cause discs 141 and 143 to scrape a greater or less quantity of the abrasive from the layer of abrasive thereon. Also, when the discs have been worn at their outer edges through contact with the abrasive, nut 86 may be rotated to move the disc assembly bodily outward to compensate for the wear of the discs. Moreover, screws 99 may be loosened and head 96 rocked in carriage 81 for effecting further adjustment of the apparatus.

It has been found that a small quantity of abrasive will rebound out of the acceleration groove without going through the wheel, but this abrasive travels at low velocity and does no harm. However, a light housing (not shown) is preferably placed about the rear part of the rotor and is provided with a hopper bottom for feeding the abrasive back into the abrasive system.

The dimensions of the parts may assume any suitable values, but I have found that, in the wheel illustrated, a rotor having an inside diameter of approximately 20 inches when used with a pair of take-off discs having a diameter of approximately 10 inches will handle commercial quantities of abrasive and impart a velocity of approximately 200 feet per second to it when the wheel is rotated at approximately 2450 R. P. M. It is to be understood, however, that the invention is not limited to any particular dimensions, and they are merely given as illustrative of the concrete embodiment of the invention herein disclosed.

Referring now to Figures 17 and 18 I have shown a modified form of discharge ring 64a which is adapted to be bolted to flange 59 of the rotor. This ring is used when it is desired to reduce the concentration of the abrasive stream or increase the width of the spray angle. Ring 64a is of waved shaped configuration and is provided with a plurality of projections 151 which are highest at the periphery of the ring and decrease in height inwardly and finally merge with the surface of the ring at the inner edge of the ring.

During operation of the wheel, when provided with this ring, part of the discharged abrasive will pass between the adjacent projections 151 and thereby be delivered substantially in accordance with the diagram illustrated in Figure 6, whereas other particles of abrasive will strike projections 151 and be deflected axially, and it is apparent that the width of the abrasive stream is materially increased by the use of this ring.

In Figures 19 and 20 I have illustrated a further form of modified ring for application to the flange 59 of the rotor and it is employed when it is desired to impart a still higher velocity to the abrasive without increasing the speed of the rotor. Ring 64b is provided with a plurality of substantially radially extending blades 152 and they are provided with beveled inner edges 153.

Blades 152 extend closely adjacent the discharge edge of the rim, with the result that abrasive picked up thereby is subjected to practically no impact whatever as the difference in velocity is very slight. However, the blades are provided with beveled edges 153 in order to insure that the abrasive will be cleanly picked up by the blades and will not rebound off their inner edges in an axial direction. In order to further insure proper pick-up of the abrasive blades 152 are provided with beveled sides 154, and with reference to Figure 20 it is apparent that the bevel is such as to cleanly pick up the abrasive as it is discharged by the take-off disc. Ring 64b may be secured to flange 59 in any suitable manner, but I have illustrated the ring as provided with threaded openings 155 which terminate in low bosses 156 on the front face of the ring. Screws may be introduced through flange 59 and threaded in the ring for holding the ring on the rotor.

In view of the fact that the blades 152 are of appreciable radial length the abrasive will be given a further acceleration as it slides outwardly over the surfaces of the blades, and the abrasive discharged therefrom will have a higher velocity than when no blades are used. Also, the abrasive will leave the blades at an angle greater than a tangent in view of the fact that they possess a radial velocity in addition to the peripheral velocity of the rotor, and this is indicated by the vector diagram appearing in Figure 20.

In Figure 21 I have shown the rotor of Figure 14 as being equipped with a deflector ring assembly and this construction is used when it is desired to obtain a discharge that is concentrated in a thin sheet adjacent the edge of the rotor. In this form of the invention the rotor is provided with a snap ring 22b carrying rivets 23b which seat in a groove in the rotor. Secured to flange 59, by means of shouldered space members 157 and bolt and nut assemblies 158, is a deflector ring 159. With this device it is apparent that when the abrasive is discharged, if it has sufficient axial componential velocity it will strike ring 159 and be deflected back toward the rotor thereby tending to confine the abrasive discharge to a thin sheet.

In Figures 22 to 25, inclusive, I have illustrated a further embodiment of the invention wherein a rotor is used having an imperforate web, but it functions in the same general manner as the forms of invention previously described.

The rotor is provided with a web portion 161 and a flange portion 162. Secured to flange portion 162, by means of a plurality of cap screws 163 or the like, is a rim member 164 and they preferably have a telescoping fit as indicated at 165. Although I have shown the rotor as comprising two separate parts, it is to be understood that the rotor may consist of an integral member if desired without departing from the spirit of the invention. The discharge end of flange 164 is provided with a snap spring at 22, exactly in accordance with the first form of the invention and it cooperates with flange 164 in the same manner as ring 22 of Figure 3.

Removably secured to flange portion 162 by means of a plurality of cap screws 166 is a dam member 167 having a plurality of abrasive openings 168. The space between member 167 and the web of the rotor defines the abrasive acceleration or pick-up groove, and abrasive is supplied thereto in a manner similar to the rotor shown in Figure 14 by means of a conduit 169 having its discharge end located closely adjacent the body of abrasive in the groove and inclined so as to substantially tangentially deliver the abrasive thereto. The particular conduit shown has been illustrated in phantom lines because it is disposed forwardly of the section taken through the rotor. In view of the fact that as the abrasive issuing from spout 169 is apt to be ricocheted against the web of rotor 161 before it finally attains the peripheral speed of the abrasive lying in the groove I preferably provide a removable and replaceable wear ring 171 secured to the rotor by a plurality of screws 172. As seen in Figure 22 plate 171 is located so as to lie in the region adjacent the level of the abrasive in the groove, indicated by the line 173.

This form of the invention functions in the manner exactly similar to those previously described, the abrasive being picked up in the groove defined by plate 167 and the rotor web and feeding through openings 168 in plate 167 onto the rim of the rotor, from whence it is discharged by discs 141 and 143 as previously described. When openings 168 have become sufficiently worn to require renewal of plate 167 the latter may be readily removed by removing cap screws 166 and sliding the ring out of the rotor. Also, when ring 171 requires replacement it may be similarly removed and replaced. It should be observed that neither of these operations require the dismantling of the machine and the machine accordingly must be out of service for only a very short time in order to completely renew the only wearing parts thereof.

In Figures 24 and 25 I have illustrated a modified form of abrasive dam and it assumes the form of a plate 167a having a plurality of substantially radial slots 175 provided therein. They are preferably inclined with respect to the axis of the rotor as shown in order to increase the amount of abrasive that may flow therethrough. In view of the fact that this plate provides a very great flow of abrasive from the pick-up zone to the discharge zone, it provides a much greater feeding capacity than the forms shown in Figures 22 and 23. Also, in view of the fact that the upper ends of slots 175 are entirely free, member 167a does not limit the height to which the abrasive may build up on the rim, and therefore line 176, which indicates the level of the abrasive preferably assumes the angle of repose both in the acceleration groove and on the discharge rim, and the feed of abrasive is adjusted to almost exactly coincide with the rate at which the abrasive is removed from the rim, in order to prevent it from spilling out or being discharged at any point other than the discharge point as determined by the take-off disc. It is observed that in both of the forms of the invention shown in Figures 22 to 25, inclusive, plates 167 and 167a perform the important function of insuring that the abrasive finding its way on the rim will be traveling at the full peripheral speed of the rim. This is brought about by reason of the fact that the abrasive must pass through openings 168 or slots 175 in order to find its way on the rim, whereas if the abrasive were allowed to travel directly from feed spout 69 to the discharge rim without passing through openings or slots, there is a possibility that it would feed onto the rim before reaching the full peripheral speed thereof.

As is well understood in the art, an unbalanced body rotating below a critical speed, and considering static balance only, will tend to rotate about its geometrical center whereas at speeds above the critical speed it will tend to rotate about its center of gravity.

Applying the above to all of the forms of wheels disclosed herein, it is apparent that if the wheel is properly balanced without any abrasive in it, the only thing that could cause an out of balance condition would be an uneven distribution of abrasive on the rim of the wheel. If abrasive is removed by a take-off disc on the inside of the rim and the wheel is rotating at a speed below its critical speed so that it is rotating about its geometric center, the heavy side will swing out, pulling the light side in towards the center. In this case the disc will take off more abrasive from the lightly loaded side than it does from the heavily loaded side, thus aggravating the condition and increasing the unbalance. At speeds above the critical speed the wheel will tend to rotate about its center of gravity so that the lightly loaded side will swing out, pulling the heavily loaded side towards the center. In this case the take-off disc will take off more abrasive from the heavily loaded side than from the lighter side, thus continuously tending to keep the wheel in balance. The wheels are, accordingly, preferably operated at speeds above their critical speeds.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an abrading apparatus, a structure mounted for rotation at high speed in a predetermined direction about a fixed axis, said structure providing a generally annular surface facing toward the axis of rotation, means for depositing abrasive upon said surface while said structure is rotating, and at least one rotatable disc for engaging and dislodging abrasive from said surface at a predetermined point in the rotation of said structure, said disc being mounted for rotation about an axis disposed at an inclination with respect to the axis of said structure and being offset a predetermined distance forwardly with respect to the direction of rotation of said structure from a plane containing the axis of said structure, the axis of said disc lying in a plane disposed substantially parallel to said first named plane and intersecting said annular surface closely adjacent the region where said disc dislodges abrasive therefrom, the abrasive being operable to pile up on said annular surface and assume a predetermined angle of repose thereon, and the axis of said disc being inclined to the axis of said structure at an angle substantially equal to the angle which the surface of said abrasive makes with the axis of said structure.

2. In an abrading apparatus, a hollow rotatable structure of generally disc-like form, said structure having a central, axially directed abrasive inlet opening, said structure terminating at its periphery in an inwardly facing generally annular abrasive supporting surface, means, rotatable synchronously with said hollow structure, for placing said abrasive inlet opening in communication with said abrasive supporting surface, and adapted to be maintained continuously filled with abrasive during operation of the apparatus, means for feeding abrasive into said inlet opening, and means for causing abrasive to be dislodged from said surface at one point in the rotation of said structure.

3. The abrading apparatus set forth in claim 2, wherein said structure is provided with a plurality of axially directed outlet openings adjacent said abrasive supporting surface for feeding abrasive thereto, said surface cooperating with said openings to maintain said hollow structure substantially full of abrasive during operation thereof.

4. In an abrading apparatus, a rotatable structure provided adjacent its periphery with an annular, inwardly facing abrasive receiving groove, means for depositing abrasive in said groove while said structure is rotating comprising a stationarily supported conveying means having a discharge portion located remote from the axis of said structure in close proximity to the normal abrasive level in said groove, said conveying means delivering a stream of abrasive to said groove over a fixed short arc in the rotation of said structure, said structure also being provided with an abrasive supporting surface adjacent said groove and adapted to be supplied with abrasive therefrom, and means for dislodging a portion of the accumulated abrasive from said surface at a predetermined point in the rotation of said structure, said conveying means comprising a conduit the discharge portion of which inclines outwardly and forwardly with respect to the direction of rotation of said structure, for causing abrasive to be substantially tangentially deposited in said groove with an impact of minimum magnitude.

5. In an abrading apparatus, a rotatable structure, said structure comprising a disc-like web portion having adjacent its periphery on each face thereof an axially directed flange, one of said flanges terminating at its free edge in an inwardly directed ring portion which cooperates with said one flange and said web portion to define an abrasive receiving groove, stationarily supported means for supplying abrasive to said groove while said structure is rotating, said web portion being provided with a plurality of apertures through which abrasive may flow from said groove and be deposited upon said other flange, and control means for causing the deposited abrasive to discharge from said other flange at a predetermined point in the rotation of said head at an abrading velocity.

6. The abrading apparatus set forth in claim 5, together with a wear plate assembly disposed in said abrasive receiving groove and removably secured in surface engagement with the web portion of said structure for preventing abrasion thereof as abrasive is picked up in said groove.

7. In an abrading apparatus, a rotor having a peripherally apertured web through which abrasive is adapted to flow, a wear plate secured in surface engagement with said web and having bosses fitting into the apertures in said web, said bosses protecting the walls of said apertures against abrasion and being provided with openings for permitting abrasive to flow therethrough.

8. In an abrading apparatus, a rotatable structure providing a generally annular surface facing toward the axis of rotation of said structure, means for depositing abrasive upon said surface, and discharge means for dislodging the deposited abrasive from said surface at a predetermined point in the rotation of said structure, said surface, adjacent the discharge portion thereof, being of generally cylindrical form, and a removable and replaceable wear ring secured in place on said surface.

9. The abrading apparatus set forth in claim 8, wherein said wear ring comprises a thin metallic split band and is resiliently sprung into place on said surface.

10. In an abrading apparatus, a rotatable structure providing an inwardly facing generally annular abrasive supporting surface, means for supplying said surface with abrasive while said structure is rotating; and means for dislodging the accumulated abrasive from said surface at a predetermined point in the rotation of said structure, comprising a pair of spaced discs mounted for rotation about a common axis which is offset and inclined with respect to the axis of rotation of said structure, said axis of said discs lying in a plane disposed substantially parallel to a plane containing the axis of said structure and intersecting said annular surface in the region where said abrasive is dislodged therefrom.

11. The abrading apparatus set forth in claim 10, wherein said discs are of different diameters and the said plane of the axis thereof is offset from the said plane of the axis of said structure forwardly with respect to the direction of rotation of said structure.

12. In an abrading apparatus, a rotatable structure providing a generally annular inwardly facing abrasive supporting surface, means for supplying said surface with abrasive while said structure is rotating, and means for dislodging a portion of the abrasive accumulated on said surface at a predetermined point in the rotation of said structure, said surface terminating in an edge over which the abrasive is discharged, said edge being of generally conical configuration for imparting an axial component of velocity to said abrasive thereby causing the discharge stream to spread out over a considerable area.

13. In an abrading apparatus, a rotatable structure providing a generally annular inwardly facing abrasive supporting surface, means for supplying said surface with abrasive while said structure is rotating, and means for dislodging a portion of the abrasive accumulated on said surface at a predetermined point in the rotation of said structure, said surface terminating in an edge over which the abrasive is discharged, said edge having a wave-shaped face for diffusing the abrasive discharging thereover, said face undulating peripherally so as to allow part of the abrasive to be directly discharged into space from said abrasive supporting surface, and to cause part of the abrasive to be deflected axially subsequent to discharge thereof from said abrasive supporting surface.

14. In an abrading apparatus, a rotatable structure providing a generally annular inwardly facing abrasive supporting surface, means for supplying said surface with abrasive while said structure is rotating, and means for dislodging a portion of the abrasive accumulated on said surface at a predetermined point in the rotation of said structure, said surface terminating in an edge over which the abrasive is discharged, and a ring member secured to said structure adjacent to, but axially spaced from the discharge edge thereof, said ring member extending outwardly a considerable distance beyond said discharge edge for controlling the degree of axial discharge of abrasive from said structure.

15. In an abrading apparatus, in combination with an abrasive propelling rotor having an inwardly facing rim, a disc assembly for dislodging abrasive from the rim of said abrasive propelling rotor, comprising at least one disc mounted for rotation about an axis which is offset and inclined with respect to the axis of rotation of said rotor, and means for supporting said disc for adjustable rocking movement to vary the inclination of the axis thereof with respect to the axis of said rotor, without varying the degree of offset, for controlling the operating characteristics of the apparatus.

16. In an abrading apparatus, in combination with an abrasive propelling rotor having an inwardly facing rim, a disc assembly for dislodging abrasive from the rim of said abrasive propelling rotor, comprising at least one disc mounted for rotation about an axis which is offset and inclined with respect to the axis of rotation of said rotor, and means for supporting said disc for bodily adjusting movement to vary the degree of offset of the axis of said disc from the axis of said rotor without changing the degree of inclination thereof.

17. In an abrading apparatus, in combination with an abrasive propelling rotor having an inwardly facing rim, a disc assembly for dislodging abrasive from the rim of said abrasive propelling rotor, comprising at least one disc mounted for rotation about an axis which is offset and inclined with respect to the axis of said rotor, and means for supporting said disc for bodily adjusting movement toward and away from the rim of said rotor without varying the degree of offset of the axis thereof from, or the degree of inclination thereof with respect to the axis of said rotor.

18. The abrading apparatus set forth in claim 17, wherein said adjusting means comprises a plate member mounted for guided sliding movement toward and away from the rim of said rotor.

19. In an abrading apparatus, in combination with an abrasive propelling rotor having an inwardly facing rim, a disc assembly for dislodging abrasive from the rim of said abrasive propelling rotor, comprising at least one disc mounted for rotation about an axis which is inclined and offset with respect to the axis of said rotor and means for supporting said disc for bodily adjusting movement in the direction of its axis toward and away from said rotor without varying the degree of inclination thereof or the degree of offset with respect to the axis of said rotor.

20. In an abrading apparatus, a rotatable structure having a web portion provided adjacent the periphery thereof with an axially directed flange structure, said flange structure providing an annular abrasive supporting surface terminating at its free end in a discharge edge and having an annular abrasive receiving surface disposed between said web portion of said rotor and said abrasive supporting surface, stationarily supported conveying means for depositing abrasive upon said receiving surface while said rotor is rotating, said conveying means having a discharge portion terminating in close proximity to, but spaced from said receiving surface, for delivering a stream of abrasive to said abrasive receiving surface over a fixed short arc in the rotation thereof; partition means cooperating with said web portion and said abrasive receiving surface to define a groove in which the abrasive is adapted to be accelerated and providing a controlled flow of abrasive to said abrasive supporting surface, and means for dislodging a portion of the abrasive accumulated upon said abrasive supporting surface at a predetermined point in the rotation of said rotor.

21. In an abrading apparatus, a rotatable structure having a pair of generally annular surfaces facing toward the axis of the rotor and disposed in side-by-side adjacent relationship; means for depositing abrasive upon one of said surfaces during rotation of said structure; said one surface having a mean diameter which is substantially less than the mean diameter of said other surface, whereby abrasive deposited on the former will centrifugally feed in one general direction to the latter; means for controlling the flow of abrasive from said one surface to said other surface; and means for dislodging a portion of the abrasive accumulated on said other surface at a predetermined point in the rotation of said structure.

22. The abrading apparatus defined in claim 21, wherein said one surface is of generally frustro-conical shape and inclines outwardly toward said other surface.

23. The abrading apparatus defined in claim 21, wherein said means for controlling the flow of abrasive comprises a ring-like member separating said surfaces and having a plurality of openings provided therein.

24. In an abrading apparatus, a rotatable structure having an outwardly extending web portion, said web portion being provided adjacent its periphery with an axially directed flange assembly, said flange assembly providing an annular abrasive supporting surface terminating at its free end in a discharge edge and having an annular abrasive receiving surface disposed between said web portion and said abrasive supporting surface, stationarily supported abrasive conveying means for depositing abrasive upon said receiving surface while said structure is rotating, said conveying means having a discharge portion terminating close proximity to, but spaced from said receiving surface, said receiving surface being operable to feed abrasive to said abrasive supporting surface, and a ring-like member secured to and rotatable with said structure and being located inwardly of said flange assembly between said abrasive supporting surface and said receiving surface, said ring-like member having a plurality of openings therein through which abrasive is adapted to be fed in predetermined quantities to said abrasive supporting surface; and means for dislodging a portion of the abrasive accumulated upon said abrasive supporting sursurface at a predetermined point in the rotation of said structure.

25. In an abrading apparatus, a rotatable structure having a generally annular surface facing toward the axis of rotation and a generally circular element dividing said annular surface into an abrasive receiving surface upon which the abrasive is adapted to be accelerated, and an abrasive supporting surface from which the abrasive is adapted to be discharged; feeding means for delivering a stream of abrasive upon said abrasive receiving surface while said structure is rotating; said generally circular element having a plurality of openings for feeding abrasive from said abrasive receiving surface to said abrasive supporting surface; and means for dislodging a portion of the accumulated abrasive from said abrasive supporting surface at a predetermined point in the rotation of said structure.

26. The abrading apparatus defined in claim 25, together with a second generally circular element cooperating with said first generally circular element and said abrasive receiving surface to provide a comparatively deep groove in which a body of abrasive is adapted to be centrifugally retained during rotation of said structure.

27. In an abrading apparatus, a rotatable structure comprising a supporting web terminating at its periphery in a substantially annular flange facing toward the axis of rotation; a circular member cooperating with said web and flange to provide a groove in which abrasive is adapted to be accelerated; a feed conduit having a discharge portion located adjacent said groove for delivering abrasive thereto; a circular disc-like wear plate detachably secured to said web adjacent the region where said feed conduit discharges into said groove, for protecting said web against abrasion, said circular member embodying passage means for feeding abrasive from said groove to said flange; and means for dislodging a portion of the abrasive accumulated on the latter at a predetermined point in the rotation of said structure.

28. The abrading apparatus defined in claim 27, wherein said flange includes a replaceable wear ring disposed adjacent the free edge thereof, and from which said abrasive is discharged from said structure.

29. In an abrading apparatus, a rotor having a generally annular surface facing toward its axis of rotation; means for delivering abrasive to said surface; and a rotatable member for dislodging a portion of the accumulated abrasive, mounted for rotation about an axis, said member being so disposed that a line normal to its axis and passing through the point on its periphery furtherest from the axis of rotation of said rotor, intersects a line normal to the axis of said rotor and passing through said point.

30. The apparatus defined in claim 29, wherein the axes of said rotor and member are located in a pair of spaced parallel planes, and the axis of said member is offset forwardly from the plane of said rotor axis with respect to the direction of rotation of said rotor.

31. An abrading apparatus comprising a rotor having an internal annular abrasive supporting surface, means for delivering abrasive to said rotor for deposit upon said surface during rotation thereof, a rotatable disc for engaging and dislodging a portion of the deposited abrasive from the rotor, and means mounting the disc for rotation about an axis which lies in a plane which is spaced from and parallel to a plane containing the rotor axis, and so that a radial line of the rotor passing through the center of the disc makes an acute angle with respect to said plane containing the rotor axis.

32. In an abrading apparatus, a rotatable structure including a hollow member providing on its interior and outermost from the axis of rotation of the structure a pair of generally annular surfaces facing towards the axis of the rotor, one of said surfaces having a mean diameter which is substantially less than the mean diameter of said other surface, and said surfaces being so adjacent and side by side with respect to each other that abrasive upon the surface of smaller diameter will feed in one general direction directly over and upon the surface of larger diameter, means disposed between the surfaces for controlling the flow of abrasive from the smaller to the larger one of them, means for depositing abrasive upon the smaller of said surfaces during rotation of said structure, and means for dislodging a portion of the abrasive accumulated on the larger of said surfaces at a predetermined point in the rotation of said structure.

GARRETT B. LINDERMAN, Jr.